UNITED STATES PATENT OFFICE.

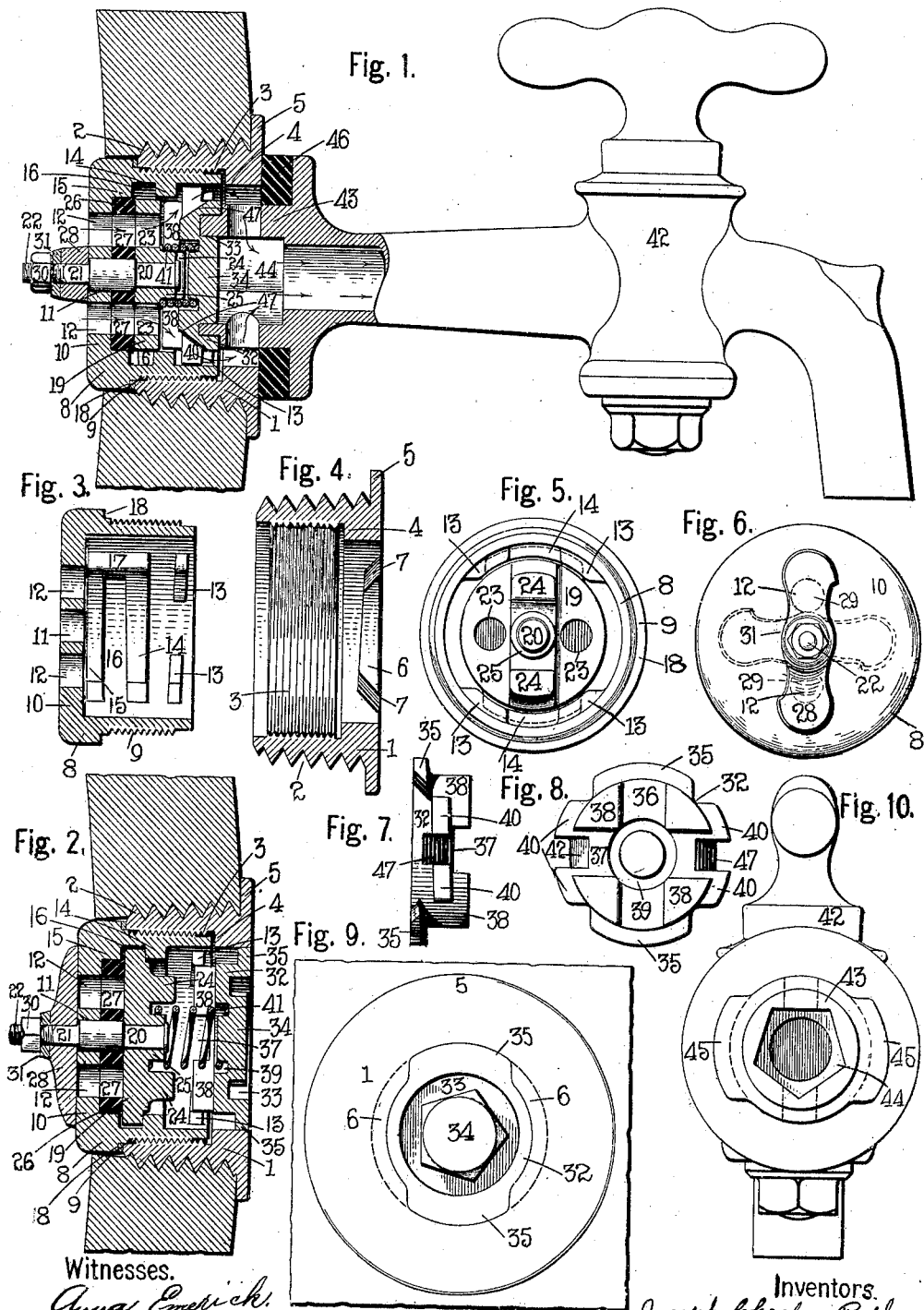

JOSEPH CHARLES ROTH, OSCAR CHARLES HARTFIELD, AND ERNEST MEREDITH HILL, OF BUFFALO, NEW YORK.

TAPPING DEVICE.

983,259.  Specification of Letters Patent.  Patented Jan. 31, 1911.

Application filed March 5, 1910. Serial No. 547,479.

*To all whom it may concern:*

Be it known that we, JOSEPH C. ROTH, OSCAR C. HARTFIELD, and ERNEST M. HILL, citizens of the United States, residing at Buffalo, in the county of Erie and State of New York, have invented a certain new and useful Improvement in Tapping Devices, of which the following is a specification.

This invention relates to improvements in valved bushings and means for operating the same and primarily to bushings designed to be inserted in the bung holes of beer and similar barrels.

The principal object of the invention is to cover and protect the valve by an element which is normally held out of contact with the valve, and is adapted to be forced into contact by the insertion of a suitable tapping device and to be turned to operate the valve by the turning of the tapping device.

Among other objects of the invention are to provide a simple compact and durable device, to utilize an exterior valve element which serves as a valve closure, a scraper and also as a support for the inner valve, to so form and fit together the component parts of the bushing that they may be easily dismounted for repair, replacement or for cleansing purposes.

The invention also relates to certain details of construction which will be hereinafter described and claimed, reference being had to the accompanying drawings in which a preferred adaptation of the invention is shown.

Figure 1 is a central vertical longitudinal section through the improved valved bushing, showing a tapping device partially in section attached thereto, the valve being in open position to permit the flow of liquor, and a fragmentary section through a barrel also being shown, in which the bushing is screwed. Fig. 2 is a central section, through the bushing on a line similar to Fig. 1 with the tapping device removed and the valve in its closed position. Fig. 3 is a detached central section through the inner member of the bushing. Fig. 4 is a detached central section through the outer member of the bushing. Fig. 5 is a detached outer face view of the inner member of the bushing showing the rotary disk valve in place therein. Fig. 6 is a rear or inner face view of the inner member showing the combined scraper and outer valve. Fig. 7 is a detached edge view of the valve operating element. Fig. 8 is a detached face view of the valve operating element. Fig. 9 is an outside view of the valved bushing in place in a barrel, a fragment of the barrel being shown. Fig. 10 is a detached rear end view of the tapping device showing the construction of the combined locking and valve operating end.

In referring to the accompanying drawings in detail like numerals designate like parts.

The bushing may be constructed in a variety of ways of which one form is illustrated in the drawings and in which adaptation two separable members are employed. One of these members which will be hereinafter termed the outer member 1, is of tubular form and has a comparatively coarse exterior screw thread 2 which is slightly tapering for engagement in the bung hole of the barrel, and an interior screw thread 3 which terminates at its outer end at an inwardly extending shoulder 4,—see Fig. 4. These threads engage with the threads of the other or inner member. The outer member 1 is provided with an outer circular flange 5 which forms an exterior shoulder which contacts with the outer surface of the barrel to limit the entrance of the bushing therein, and two oppositely located inwardly extending segmental flanges or locking lips 6 are arranged on the interior at the outer end thereof. These lips 6 have their inner edges 7 beveled as shown in Fig. 4. The other member, which will be subsequently referred to as the inner member 8, is constructed substantially as shown in Fig. 3 and likewise is of tubular form having an exterior screw thread 9 which screws in the screw thread 3 of the outer member and an inner end 10 which is provided with a central opening 11 and two outlet openings 12 located on opposite sides of the central opening. The inner member 8 is provided on its inner surface with a plurality of comparatively short lugs 13 having their side edges inclined or beveled to a suitable degree and which are located in the vicinity of its outer end and at suitable intervals around the interior of the inner member and are separated from each other by suitable spaces, as shown in Fig. 5. Between the inner end 10 and the lugs 13 are located inwardly extending transverse ribs 14 and 15 which are arranged in parallel pairs with the ribs of each pair separately sufficiently to leave a slideway space 16. The ribs are slightly longer than one quarter of the inner circumference of the inner member and they are connected together at one end by a short inwardly extending rib 17, as shown in Fig. 3, which constitutes a stop for a purpose to be hereinafter explained. The exterior of the inner member is enlarged in the rear of the screw threaded portion 9 to form a shoulder 18 which limits the entrance of the inner member in the outer member. A rotary disk valve 19 is slidably supported within the inner member between the pairs of ribs 14 and 15 and is provided with a central stem 20 which is rotatably fitted in the central opening 11. The inner end of the stem 20 projects beyond the outer surface of the end 10 of the inner member of the bushing and has a reduced portion 21 of square or equivalent cross section which terminates in a screw threaded end 22. The disk 19 is provided with two openings 23 which constitute valve ports and are located on opposite sides of the stem and are adapted to register with the openings 12 in the end 10, of the inner member when the valve is in open position, as shown in Fig. 1. The disk 19 is also provided with two projecting knobs 24 on its outer face which are located on opposite sides of a center knob 25 and at about equal distance therefrom.

Between the inner surface of the end 10 of the inner member and the inner face of the disk 19 is located a fairly thick disk 26 of rubber or other equivalent material which serves both as a resilient cushion and a packing to secure a tight joint. This disk 26 is non-rotatable and is provided with a central opening through which the stem of the disk valve passes and two side openings 27 which register with the side openings 12 in the end of the inner member of the bushing.

An outer valve member 28 is fitted on the projecting portion 21 and has an opening in its middle portion of corresponding shape so that the member cannot turn independently of or on the stem. In form, the member 28 is of an elongated character having curved side edges 29 which are beveled or sharpened to form scraping edges, and it is adjusted relatively to the inner valve disk by a nut 30 which is screwed on the outer screw threaded end 22. A washer 31 is fitted between the valve member 28 and the nut 30, as shown in Figs. 1 and 2. The elongated valve member 28 is so located and arranged with reference to the inner valve disk that its oppositely projecting portions fit over and close the rear mouths of the openings or ports 12 when the disk valve 19 is turned to a closed position and cover the front mouths of the openings or ports. The valve member 28 serves as an outer valve, a scraper for cleaning the thickened residue of beer or other liquid from the margins of the openings or ports, thus preventing the clogging of the same and also as a support for the outer end of the stem 20 to maintain it against longitudinal movement.

It will be noted by referring to Figs. 1 and 2 that the inner valve disk is completely inclosed within the bushing and is not connected directly to the tapping device.

In the outer or front portion of the outer member of the bushing is rotatably and slidably fitted an element 32 which constitutes both an end closing cap, and a protecting device for the inner valve and also an operating or turning means for the same. This element 32 is formed substantially as shown in Figs. 7 and 8 and is a circular disk having its outer or front face provided with a recess 33 in which a central projection 34 of pentagonal form is located, see Fig. 9. Oppositely extending lips 35 are arranged on opposite sides of the edge of the outer portion of the disk or element 32 with their outer surfaces flush with the outer surface of the disk, and are so formed that the outer face of the disk is shaped substantially to the contour of the front opening in the outer member of the bushing, as shown in Fig. 9, and the inner surfaces or side edges of the lips are slanted to form a wedging surface. The inner or rear face of the disk is provided with grooves 36 and 37 which extend radially across the face thereof and at right angles to each other and leave four inwardly projecting corner lugs 38, as shown in Fig. 8. An annular groove 39 is also formed in the center space between the lugs 38. Lugs 40 arranged in pairs project from opposite sides of the edge of the disk. These lugs are slanted slightly as shown in Fig. 7 and are adapted to fit against the flanges or locking lips 6 when the operating disk is in its outer or non-valve operating position, and to slide between the lugs 13 and the ribs 14 and 15 when the disk is in its inner or valve operating position. The outer operating disk is normally maintained out of operative contact with the rotary disk valve by a coil spring 41 which is fitted between the same, as shown in Figs. 1 and 2. One end of the spring being fitted around the central knob 25 and the opposite end inserted in the annular groove 39.

The valves of the bushing are opened and closed by the insertion and partial rotation of a suitable tapping device, which, as shown in the accompanying drawings, consists of a faucet 42 having a key element 43 at its inner end which is provided with a pentagonal socket 44 to receive the central projection 34 of the operating disk and two oppositely extending lips 45 which slide and engage beneath the lips 6 of the outer member of the bushing. By comparing Figs. 9 and 10, it will be seen that the end surface of the key element substantially corresponds in contour to the outer face of the operating disk so that it will fit perfectly in the outer opening of the bushing. A thick washer 46 is placed on the tapping device to insure a tight unleakable joint when the tapping device is attached to the valve bushing. In operating this device, the tap is pressed against the operating disk forcing it inwardly in the bushing and bringing its corner lugs 38 in lapping engagement with the knobs 24 of the rotary valve disk. A partial turning movement of the tapping device will now impart a corresponding movement to the operating element or disk and in turn, owing to the interlapping lugs and knobs will give a partial rotation to the rotary valve disk and the outer elongated valve and free the openings or ports to allow the liquor to flow into the faucet. The partial turning movement, owing to the slanting or beveled character of the inner segmental flanges 6 of the bushing also draws the tapping device in tight unleaking connection with the bushing.

The course that the liquor follows when the valves are open is indicated by arrows in Fig. 1. In this connection it will be noted that portions of the edge of the operating element or disk are cut away as shown at 47 in Figs. 1, 7 and 8, to provide a fair sized path for the liquor on each side of the operating element, and thus insure a steady and sufficient flow for the liquor when the valves are open. As both the inner rotary disk valve and the outer elongated valve are unrotatably mounted on a common stem they are moved in unison and open and close simultaneously. The stops 17 limit the turning movement of the rotating valve disk in either direction and are located diametrically opposite each other, so that the range of movement of the valve disk in either direction is limited to one-quarter of a complete revolution. Owing to this arrangement the openings 23 in the valve disk register perfectly with the openings 12 in the bushing end, when the valve is in the open position, and when the valve is in its closed position the openings 23 are completely out of register with the openings 12, and are located at points equally distant between the openings 12.

The main advantages of this construction reside chiefly in the double opposed valve construction by which the openings or ports 12 are closed at both ends; in the outer closing element or disk which protects the valve disk from dirt, dust, etc., and serves as a valve operating means, and in the yielding manner in which the outer element is normally maintained out of operative contact with the disk valve. In this construction the valves are always closed when the valve operating element is in its outer inoperative position, and they are entirely concealed and protected from harm and cannot be opened except by the insertion of a suitable tapping device. When the valves are open the valve operating element is held in interlocking contact with the inner valve disk and the tapping device is locked to the bushing, and neither can be released except by a movement of the tapping device, in the proper direction to close the valves.

It will be noted that the valve operating element is of a self-closing type, that is to say the spring acts to force it outward, and to yieldingly maintain it in the position in which its outer face will be approximately flush with the outer face of the bushing.

This improved valve bushing may also, if it be desired, be used as a vent.

We claim—

1. In a device of the class described, the combination with a tubular bushing having a port for the passage of liquid, of a valve element adapted to open and close the port in said bushing and a valve operating element constructed and arranged to have both a rotary and a sliding movement in said bushing; said valve operating element being adapted to be engaged and forced inwardly by a tapping device to operatively engage the valve element.

2. In a device of the class described, a tubular bushing, a rotary valve in said bushing, and a valve operating element in said bushing constructed and arranged to have both a rotary and a sliding movement therein.

3. In a device of the class described, the combination with a tubular bushing having a port for the passage of liquid, and a valve adapted to open and close said port, of a valve operating element constructed and arranged to have both a rotary and sliding movement in said bushing and provided with means on one face for operatively engaging the valve, and means on the opposite face for operatively engaging a tapping device.

4. In a device of the class described, the combination with a tubular bushing having a port for the passage of liquid and a valve adapted to open and close said port, of a valve operating element in said bushing constructed and arranged to have both a rotary and a sliding movement therein; said valve operating element having means of attachment on its exterior face for a tapping device.

5. In a device of the class described, a tubular bushing, a rotary valve in said bushing and a valve operating element in the bushing in front of the rotary valve, constructed and arranged to have both a rotary and a sliding movement in said bushing, and a spring between the rotary valve and the valve operating element for yieldingly maintaining the valve operating element in an inoperative position.

6. In a device of the class described, a tubular bushing and a plurality of rotary disks in said bushing, one of said disks constituting a valve and another a valve operating element and the valve operating element being movable in and out of operating position with respect to the valve disk.

7. In a device of the class described, a tular bushing and a spring between the valve operating element both mounted in the tubular bushing and a spring between the valve element and the valve operating element.

8. In a device of the class described, a tubular bushing having a closed inner end provided with an opening or port for the flow of liquid, a valve element within the bushing having a corresponding opening or port and a self closing combined outer closing cap and valve operating element located within the bushing in front of the valve element.

9. In a device of the class described, a tubular bushing having a closed inner end provided with an opening or port for the flow of liquid, a valve element within the bushing having a corresponding opening or port and a self closing combined outer closing cap and valve operating element located within the bushing in front of the valve element; said valve operating element also having passages for the liquid.

10. In a device of the class described, a tubular bushing having a closed inner end provided with a port for the flow of liquid and an opening for a valve stem, a valve element within the bushing provided with a corresponding port, and a valve stem rotatably mounted in the opening in said bushing; said valve element having a flat rear surface around the valve stem and projections on its front surface, and a packing disk of resilient material interposed between the valve element and the bushing end, and having a corresponding port for the passage of liquid and a corresponding opening for the valve stem, and the front face of said resilient disk being flat and fitting closely against the flat rear surface of the valve element, and a valve operating element in the bushing in front of the valve element constructed and arranged to have both a rotary and a sliding movement in said bushing and provided with projections on its rear face adapted to interlock with the projections of the valve element.

11. In a device of the class described, a tubular bushing having a closed inner end provided with a port for the flow of liquid, and a central opening for a valve stem, and a rotary valve disk in the bushing having a stem extending from its rear face through a central opening in the inner end of the bushing, and a projection or knob on its outer or front face, said rotary valve also being provided with an opening adapted to register with the port in the inner end of said bushing when the valve is in open position, and a valve operating element in said bushing in front of the rotary valve, said valve operating element being adapted to have both a rotary and a sliding movement in the bushing and having a lug on its rear face adapted to interlock with the projection or knob of the rotary valve when the valve operating element is moved inwardly into its valve operating position, and means for normally maintaining said valve operating element in an outer inoperative position.

12. In a device of the class described, a tubular bushing having a closed inner end provided with a port for the passage of liquid, and an elongated rotary valve element located on the exterior of the inner end of the bushing and having oppositely curved side edges which are beveled or sharpened to constitute scraping edges.

13. In a device of the class described, a bushing provided with a port for the passage of liquid and a plurality of separate elements in said bushing, one of said elements being located against the closed end of the bushing and being formed of material to constitute a packing, another of which is arranged in proximity to, and is adapted to open and close the port for the passage of liquid, and a third of which forms a valve operating element and is constructed and arranged to have both a sliding movement and a rotary movement within the bushing.

14. In a device of the class described, a tubular bushing having a closed inner end provided with a port for the passage of liquid and an open outer mouth, a valve element in the bushing in operative proximity to the inner end of the bushing, and a valve operating element located in the bushing in front of the valve element and adapted to be normally in position to close the outer mouth of the bushing and to be moved in an operative position with respect to the valve element by the insertion of a tapping device in the bushing.

15. In a device of the class described, a bushing having a closed end provided with a port for the passage of liquid, a packing disk arranged within the bushing at the inner end thereof and having one face against the inner surface of the closed end of the bushing, a rotary valve disk mounted within the inner portion of the bushing and having one face against the opposite face of the packing disk; said disk being provided with knobs on its other face, and a valve operating disk within the outer end of the bushing; said valve operating disk being provided with lugs on one face adapted to interlock with the knobs of the valve disk and means on its opposite face for attachment to a tapping device.

JOSEPH CHARLES ROTH.
OSCAR CHARLES HARTFIELD.
ERNEST MEREDITH HILL.

Witnesses:
CARL H. SMITH,
GEORGE D. CROFTS.